April 21, 1931.  E. R. CRUTCHER ET AL  1,801,662
METALLURGICAL FILTER AND ARTICLE THEREFOR
Filed Aug. 31, 1929   3 Sheets-Sheet 1

INVENTORS:
Ernest R. Crutcher
Emmett Wattman
BY Wallace G. Roof
Carl H. Crawford
ATTORNEY April 21, 1931. E. R. CRUTCHER ET AL 1,801,662
METALLURGICAL FILTER AND ARTICLE THEREFOR
Filed Aug. 31, 1929 3 Sheets-Sheet 2

INVENTOR
Ernest R. Crutcher
BY Emmett Kattman
Wallace G. Woolf
Carl H. Crawford
ATTORNEY April 21, 1931.  E. R. CRUTCHER ET AL  1,801,662
METALLURGICAL FILTER AND ARTICLE THEREFOR
Filed Aug. 31, 1929  3 Sheets-Sheet 3
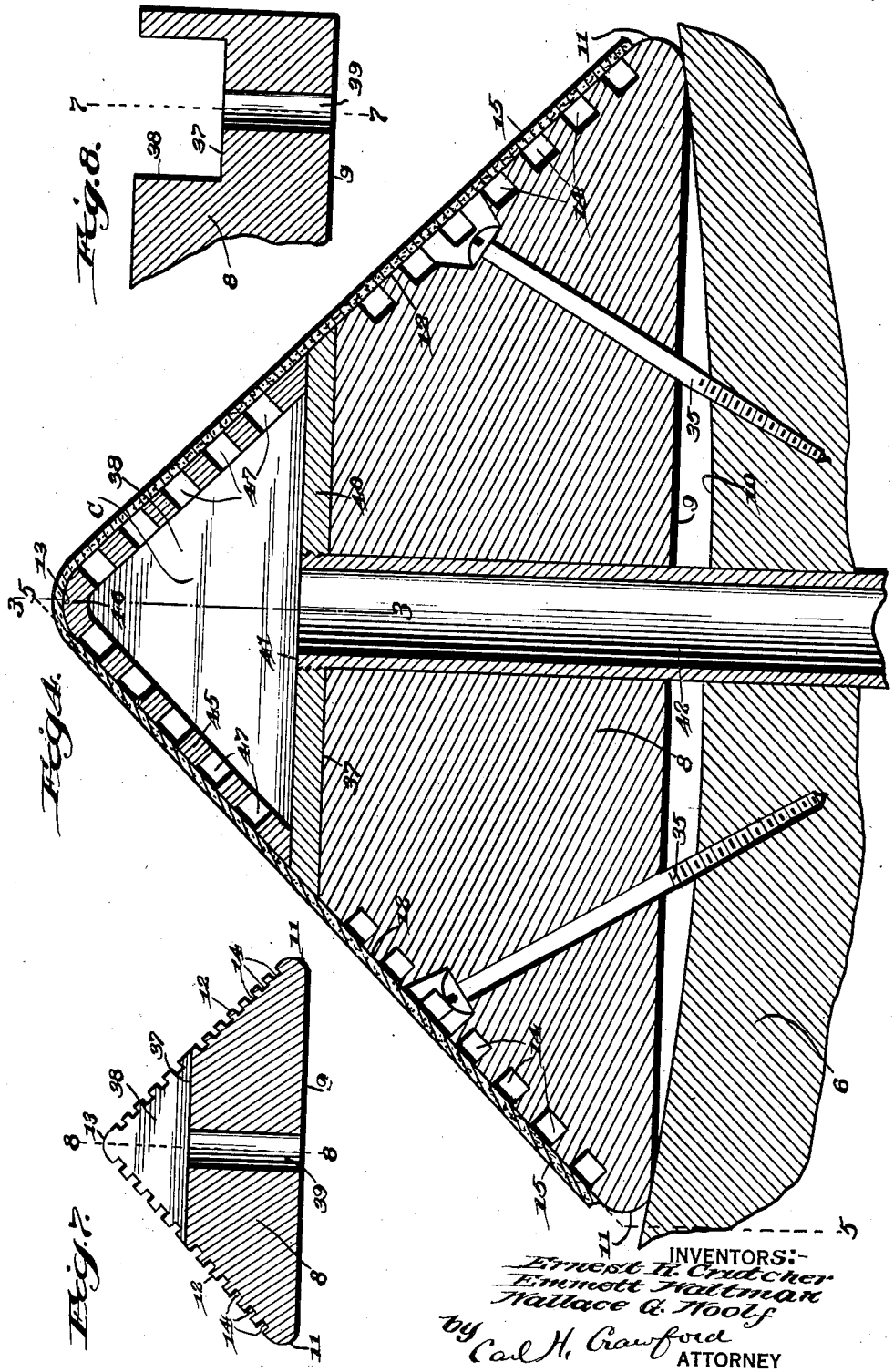
INVENTORS:-
Ernest R. Crutcher
Emmott Haltman
Wallace A. Woolf
by Carl H. Crawford
ATTORNEY Patented Apr. 21, 1931

1,801,662

UNITED STATES PATENT OFFICE

ERNEST R. CRUTCHER, EMMETT WALTMAN, AND WALLACE G. WOOLF, OF KELLOGG, IDAHO

METALLURGICAL FILTER AND ARTICLE THEREFOR

Application filed August 31, 1929. Serial No. 389,744.

This invention relates to improvements in rotary filtering mechanism which is primarily intended for use in the metallurgical art and which is more specifically designed and adapted for the recovery of zinc solution from mineral ore pulp, although its utility is not wholly limited to the performance of this function.

In this type of slowly revolving filter, the pulp is maintained at a relatively high temperature and filtering is accomplished by a motivating agent or means which may be either suction or internal pressure, and the filtering structure, with which the usual filter rotatable cylinder is equipped, comprises a series of channelled filter members and a filter cloth.

It is a feature of this invention to provide a novel filtering structure which is so constructed and shaped as to present to the pulp a very greatly increased filtering area, compared to what has heretofore been possible, without enlarging the filter cylinder either diametrically or longitudinally.

More specifically speaking, this feature is consummated by a novel form of filtering member or bar which is provided with a cross section that results in the filtering area assuming a widely sloping and transversely divergent hill and vale or undulating contour which performs the dual function of relatively enlarging the filtering area and more effectively agitating, lifting and discharging the pulp as the hill and vale filtering area passes through and ascends above the pulp.

A further feature consists in a novel manner and means of disposition of the filtering cloth, with which the channelled bars are faced, whereby substantially all of the area of the cloth will actively function, and whereby a single sheet of such cloth may serve to face and coact with a plurality of filter bars.

The invention also involves a novel means for anchoring the filter cloth in such a manner that each filtering unit is sealed and segregated from all the other units, as regards discharge of the filtered solution, whereby if the cloth becomes worn or a hole forms in one unit thereby causing the egressing solution to become muddy, such unit can be shut off without affecting any of the other units. A special phase of this novel feature involves means for sealing the filtering units for egressing segregation thereof, both longitudinally and circumferentially of the filter.

As a direct result of the novel features of anchoring the filtering cloth, the filter bars can be permanently anchored to the lining of the filtering cylinder to form a fixed part of the equipment thereof, thereby avoiding the necessity of removing said bars when a new filtering cloth is installed.

The improved filter structure is also addressed to a novel means for discharging the filtered solution which involves chambering the filter bars along their radially inner apices or vertices in such a manner as to afford discharge of the solution and not interrupt the cross sectional continuity of said bars.

The invention comprises an improvement in the filter mechanism, as a combinative entity, and also to novel features of the filter bars as an article of manufacture, and the invention will be more fully described in connection with the accompanying drawings and will be more particularly pointed out in and by the appended claims.

In the drawings:—

Fig. 3, is a sectional view on line 3—3 of Fig. 4, illustrating the novel means whereby the solution is discharged from the filter structure.

Fig. 4, is a sectional view on line 4—4 of Fig. 3, showing the same structure from a different sectional viewpoint.

Fig. 6, is an enlarged fragmentary sectional view of two adjacent filter bars and illustrating the manner in which the filtering cloth is anchored circumferentially of the filter.

Fig. 7, is a sectional view on a reduced scale of one of the filter bars and is taken on line 7—7 of Fig. 8.

Fig. 8, is a sectional view on line 8—8 of Fig. 7.

Fig. 9, is a sectional view on line 9—9 of Fig. 5, the same being on a reduced scale.

Like characters of reference designate similar parts throughout the different figures of the drawings.

A rotatable filter cylinder is very generally indicated at 1, the same having suitable tracks 2, mounted on wheels 3, and being rotated by any suitable means about its own longitudinal axis. Any suitable means, designated as a whole at 4, may afford an axial supply of steam, and the means of charging the cylinder with pulp need not be considered.

Figure 1:
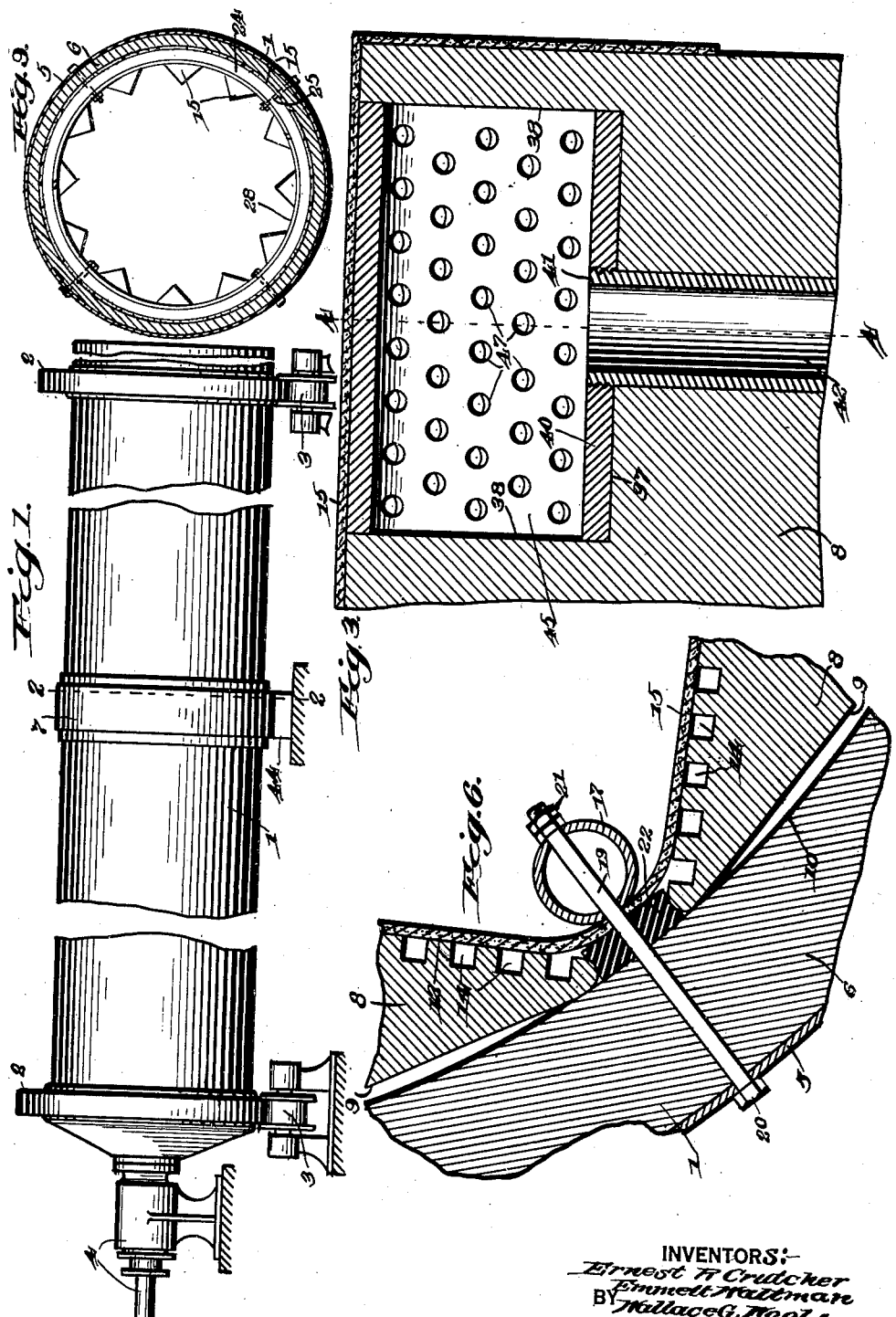
Fig. 1, is a view in elevation of a metallurgical filter for which the device of this invention is primarily intended.
Figure 2:
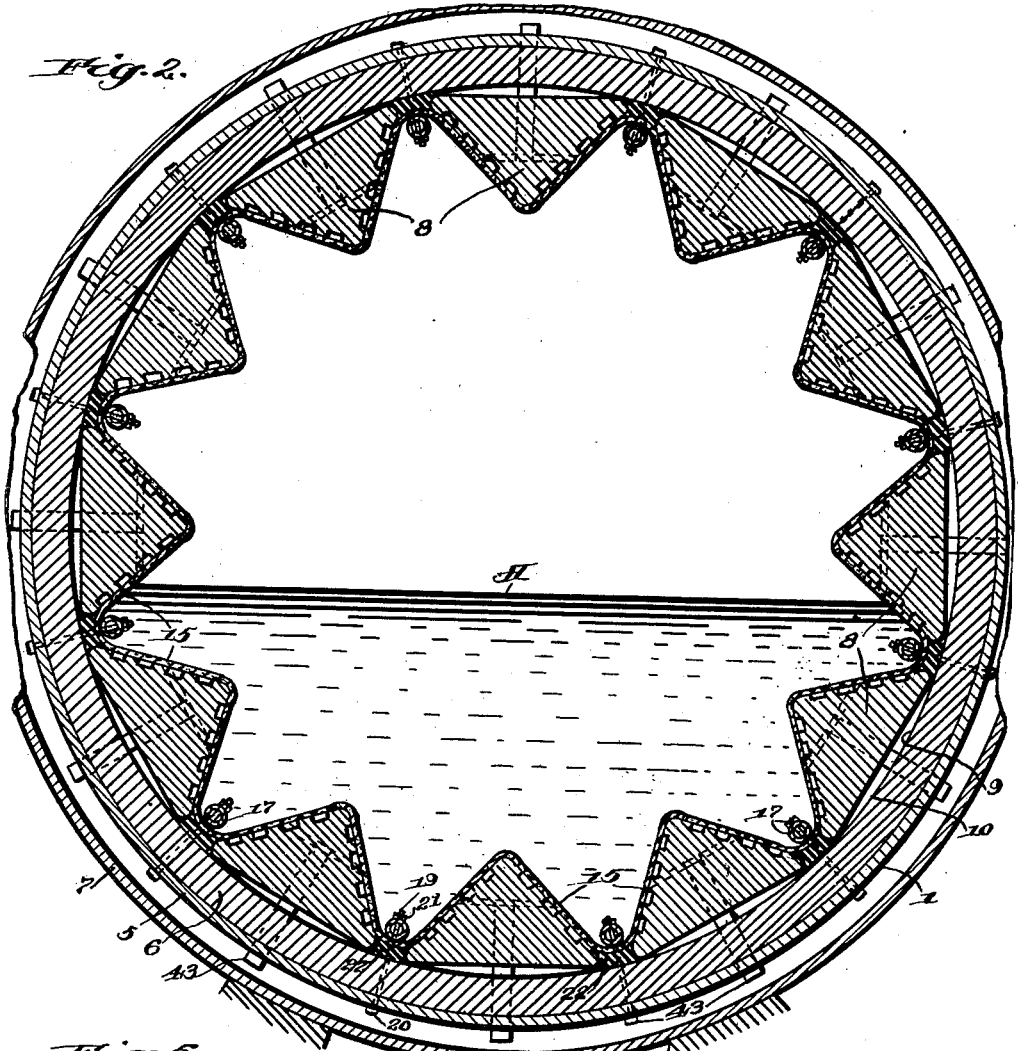
Fig. 2, is a sectional view on line 2—2 of Fig. 1, showing the cylinder on a relatively enlarged scale and illustrating the application thereto of the device of this invention.

Referring to Fig. 2, it will be seen that the cylinder is shown made up of an outer casing 5, one only being shown, and that said casing is lined with wood or the like, as indicated by 6, as is usual, thus reducing heat radiation. This is the general construction employed in this type of filter where an internal pressure medium is employed as a motivating agent to force the solution through the filtering structure. The solution that has been filtered through the pulp is discharged at a plurality of radial and circumferential points from the filter cylinder, and a stationary jacket 7, is shown for receiving the solution from the rotating cylinder, as will be presently more fully described.

Reference will next be made to that portion of the subject matter which, in combination with the foregoing, and independently thereof, constitutes the inventive improvement.

The filter structure specifically shown, includes a series of members, sections or bars 8, which in practice are generally made of wood and which are disposed in lateral juxtaposition with respect to each other against the interior lining 6, of the cylinder. Said bars are disposed longitudinally of the cylinder and in actual practice, there are two sets of bars in end to end relation, and adjacent spaced ends, which are generally disposed in a longitudinal central position with respect to the cylinder, are the discharge ends, as will presently appear.

Referring now to the particular structure of the improved bars and especially to Fig. 4, it will be seen that the same are of triangular cross section although it is not essential that they be either equi-lateral or equi-angular. One side, designated at 9, is what will be termed a smooth or plane side and this side 9 is disposed abreast of the concaved interior 10, of the filter cylinder, as shown. The linear vertices or apices 11, abut against the cylinder wall 6 and the intermediate plane surface or side 9 is in spaced relation therewith. The remaining sides 12, extending from vertices 11 to vertex 13, are the functioning sides of the bar 8, which may be termed the filter sides or faces, and the same are provided, each with a series of longitudinally disposed channels 14 for conveying the filtered solution, which is in this case, the zinc solution, and hence these channels may be termed filter channels. It will be noted that these bars present a continuous undulating hill and vale contour with the hills sloping in widely divergent relation transversely of the bars.

These bars 8, all of which are identical in structure and function, and only one of which need be described in detail, are disposed completely about the internal circumference of the cylinder 1, as shown in Fig. 2, and these bars constitute one portion of the filter structure.

The remaining portion of the filter structure is formed by a filter cloth 15 which is usually of a canvas having the required or desired openness of texture for the materials being filtered. Heretofore, the filter bars or like integers have been enclosed by the filter cloth, the latter being formed into an envelope to receive such integer, and hence only that portion of the cloth presented to the pulp has been active, and further, each integer and its cloth were entirely separate and distinct from the remaining integers.

Now it is a feature of this invention to effect a very material saving in the amount of filter cloth employed, in fact, by means of this improved disposition of the cloth, a greatly increased filter area can be presented with a greatly reduced amount of cloth, in addition to many other advantages of a more incidental nature.

As shown, a single sheet of cloth 15 may be extended longitudinally and circumferentially of the interior of the cylinder abreast of the active faces of a plurality of bars 8, and hence, instead of only a portion of the filter cloth being active, all but the merest moiety at anchorage lines, is in full functioning disposition to the pulp. In fact, if a single integral cylinder of such cloth could be woven, such a cloth body could advantageously be employed in the present construction. Thus by referring to Fig. 2, it will be seen that the cloth 15 extends abreast of the channelled sides of each and every bar 8 without traversing the plane or blank sides 9.

As a result of the filtering operation, the pulp tends to cake on the filter cloth and the problem of finally removing the cake would be considerably complicated if the filter cloth were fitted tightly on the bars. Further, chemical action of the ingredients of the pulp, and attrition to which the cloth is subjected during the filtering operation, would greatly shorten the life of the cloth if the latter were fitted tightly against the bars. The present novel anchoring means lends itself very readily to a loose fit of the cloth so that on ascending bars the weight of the caked pulp will tend to flex the cloth and pull the latter away from the bars thereby breaking up the caked pulp. When a partial vacuum is established in the cylinder the cloth can be pulled away from the bars further to facilitate breaking up of the caked pulp. Suction through pipe 4 may be effected to form a partial vacuum in the cylinder.

This novel anchoring means for the cloth will now be specifically described.

The cloth 15 is not anchored or in any way fastened to the filtering sides or vertices of the bars 8 and is fairly loosely disposed thereon. Intermediate of adjacent bars 8, a linear retaining or cloth holding member is disposed, and for mechanical convenience, this member takes the form of a pipe 17, as indicated in Fig. 2 but as more clearly shown in Fig. 6. This pipe has the advantage of presenting to the cloth 15 a rounded or cylindrical surface thereby avoiding injury which might result from a sharp surface engagement. It will be noted that these pipes 17 are located in what might be termed the vales between the hills, which is a result of the novel cross section of the bars 8, as will later be more fully explained. Of course these pipes 17 may, and in fact do, in many constructions, extend the entire length of the cylinder but they may be in sections if desired. Further, the rounded surfaces presented by these pipes to the cloth act to preserve the cloth in its initially installed position and prevents the latter from assuming an undue tautness abreast of one bar and a like looseness along an adjacent bar. Means such as bolts 19, extend through the pipes 17 and radially through the cloth and the cylinder, and are suitably provided with heads and nuts 20 and 21, respectively.

The novel means affording abutment for the pipes 17, will next be described in detail.

The companion means or members, of pipes 17, in anchoring the filter cloth, are in the form of sealing means which are embodied in the form of strips 22. These strips are preferably of yielding material, such as rubber, and they are interposed between adjacent bars 8, as shown in Fig. 6. Said strips 22 directly take the compressive stress imposed or resulting from tightening the nuts of bolts 19, and hence it will be seen that the anchored portions of the cloth are interposed between the pipes 17 and the abutment strips 22. Said strips are of sufficient thickness so that the pipes 17 will not cause the filter cloth to engage the bars 8, in fact, the pipes are small enough in diameter to prevent such engagement. As shown, the bolts 19 pass through said strips.

In practice it is preferred to very snugly fit the strips 22 between the apices 11 of adjacent bars 8, and this snug fit, in addition to the compressive action of the bolts 19 in anchoring the cloth, enables the strips 22 to perform the additional function of sealing the filtering units laterally from each other, and as this structural feature of the invention extends longitudinally of the filter, it will be termed the longitudinal sealing means for the filter units, in contradistinction to the circumferential sealing means, which will be later described. At this point it is informative to state that a filtering unit comprises one bar 8, with its two faces 12, and the extent of filtering cloth necessary to cover the filtering faces or sides of a bar. Thus, each bar, throughout its length, with its equipment of filtering cloth, is a filtering unit. In cases where two sets of bars are employed and disposed in aligned and spaced end to end relation, each bar with its complement of filtering cloth will still be a filtering unit.

Before describing the manner in which the filtering cloth is installed, reference will next be made to the novel means for sealing the units from each other and anchoring the cloth circumferentially of the filter.

Figure 5:
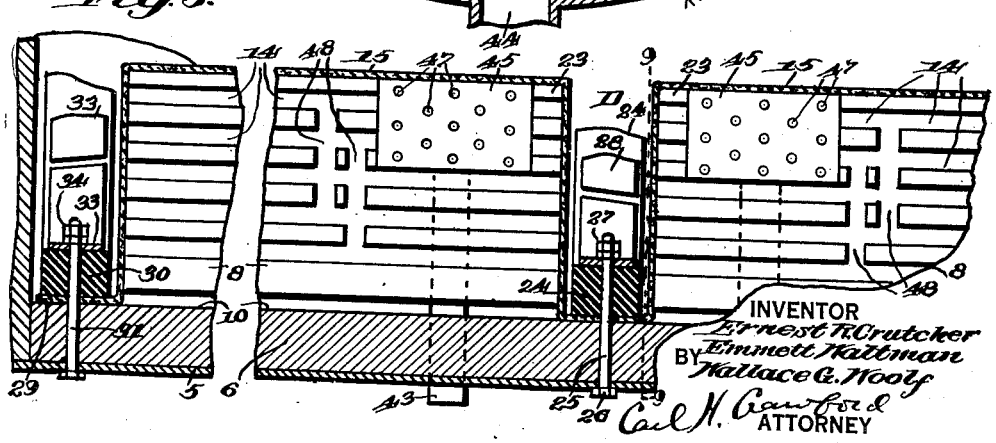
Fig. 5, is a sectional view on line 5—5 of Fig. 4, and showing the disposition of the discharge portions together with the means for anchoring the cloth at the ends of the filter bars.

Referring to Figs. 5 and 9, it will be seen that the two sets of bars 8 have their adjacent ends 23 disposed in spaced relation and the filtering cloth 15 is looped radially outwardly of the cylinder 1, into the resulting space D, and against the lining 6. A rubber or like yielding sealing means is provided which may be in the form of a ring 24, or segments of a ring, adapted to extend circumferentially about the perimeter of the lining 6, as shown in Fig. 9. Means such as bolts 25 pass through said sealing ring and the cylinder 1, and have heads 26 and nuts 27. It is advantageous to employ a washer, which may be segmental, and ring shaped, as shown at 28, and through which the bolts 25 extend. As the nuts 27, are turned home, the cloth that is interposed between the lining 6 and the sealing ring 24, is tightly pressed against the lining 6, to afford a liquid tight annular seal. The endwise edge 29, of the cloth 15, is likewise interposed between the lining 6 and a sealing ring 30, disposed at each end of the cylinder 1. Bolts 31 extend through the cylinder 1, the cloth 15 and ring 30, and through a suitable washer ring 33, and have nuts 34, whereby the parts can be tightened to form an annular seal at these ends of the bars 8 which are disposed at the ends of the cylinder 1.

It will now be clear that each filter unit is sealed both longitudinally and circumferentially of the filter. Now assume that chemical action or attrition caused a hole to be formed at any part of the active faces of a bar 8, which would of course permit portions of the pulp to pass into the channels 14 and hence muddy the solution as it passes out the nipple pipes, to be later described. In that event, it will be clear that only one unit would be thus affected. The corresponding nipple pipe would be plugged and the remaining units of the filter would function without impairment and it would not be necessary to shut down the filter. In an installation as shown, where two sets of bars 8 are employed, the circumferential sealing means localizes a leak in the canvas filtering cloth to that bar adjacent to the leak, and its end to end companion bar is not at all affected. When it is considered that these filter cloths are changed as often as six weeks duration the importance of this feature will be more fully appreciated. Even in installations where only one set of bars is employed, the circumferential sealing means is important and useful not only as such, but as a means for facilitating the mounting of the cloth.

It will now be clear that in this novel construction, the bars 8 can be permanently secured in place because of the novel means of mounting and removing the filter cloth, and I have shown bars 8 anchored by means such as screws 35, as illustrated in Fig. 4.

In installing the cloth, the latter is suitably pieced so that in width it will exceed the length of the cylinder 1 in order to make allowance for circumferential sealing anchorage. The length of the cloth will be in suitable excess of the internal circumference of the cylinder to be depressed into the vales between the hills formed by the bars 8. One length edge will first be disposed subjacent an initial pipe 17, and then under succeeding pipes until the initial pipe has been reached, whereupon the free length edge will be disposed beneath said initial pipe in lapped relation with the first edge. The pipes will of course be drawn tightly against the abutments 22 and this will complete circumferential installation. Then the width edges and the intermediate portion will be secured by the rings 24 and 30, as heretofore described, and the installation will have been completed. Removal need not be described as it will be obvious from the foregoing.

In this type of filter, reliance is not placed upon filtering the solution through the filter structure by centrifugal action, but rather by solution motivating means, which, in the present case, is in the form of an internal pressure, preferably steam, at about forty pounds to the square inch. The internal temperature is around the boiling point of water. Of course, the internal pressure acts upon the entire filtering area and drives the filtered solution in the filtering channels 14, toward the egress ends of the filter bars 8.

It is now in order to describe that novel feature of this invention whereby the filtered solution is egressed through the filter structure.

In Fig. 5, the ends of opposing sets of bars 8 are designated at 23 and these ends may be termed the discharge ends. As all of the bars 8 are equipped with identical means of egress, only one need be described in detail, reference being had to Figs. 3, 4, 5, 7 and 8.

Said bar is recessed or cut away across its linear vertex 13, and the lower wall of such recess is indicated at 37, the side walls being designated at 38. A bore 39 leads from wall 37 downwardly through bar 8 and opens at the plane side 9. It will be noted that this recess interrupts the cross sectional continuity of the active portions or faces 12 of bar 8, and hence if provision were not made to avoid the defect, the filter cloth would objectionably sag into such recess.

It is therefore a feature of this invention to provide means affording egress of the solution through this recessed portion and preserve the cross sectional continuity of the bar.

As shown, a nipple pipe anchorage plate 40 is suitably fixed in said recess upon wall 37, thereof, and is shown provided with a threaded opening in which the threaded intake end 41, of a nipple pipe 42, is turned. Said pipe 42 is disposed in bore 39 and extends radially outwardly through cylinder 1. From the outer ends 43, of said pipes, the solution is discharged into the stationary annular receiver 7, having a discharge outlet 44.

A crown structure is provided for the recessed portion which may be of inverted V-form, the same having inclined sides 45, and a suitable apex 46. This structure may be made integral with plate 40, but is shown separate therefrom and would in practice be secured thereto. The sides 45 are shown provided with holes 47 for egress of the solution from channels 14 into the resultant chamber B, wherefrom the solution will discharge through the nipple pipe 42.

In Fig. 5, it will be seen that the egressing means intersects the uppermost channels 14 so that the latter can readily discharge into the openings 47. The lower channels 14 are shown connected with the upper channels by transverse channels 48, to facilitate delivery from all the channels to said openings 47, beneath the cloth 15.

It will now be clear, broadly speaking, that the filter area presented to the pulp is of an undulating, sinuous or hill and vale contour of a transversely divergent nature, which very greatly increases the filtering area as compared to one that is cylindrical. In the specific form shown, this undulation is effected by one portion of the filter structure, namely, the bars 8, and it is by reason of the fact that these bars have a sufficient variation of cross section that this feature is consummated with a single layer of strata of such integers. Because of the simplicity of manufacture, this feature is best realized by making the bars 8 triangular in cross section.

The filtering sides 12, of bar 8, afford space for many more channels than a flat board would accommodate, and in addition, they provide a foundation on which a greatly increased spread of filter cloth can be made. As this filter structure passes through the pulp, in the lower portion of its circular travel, it agitates the same in a most effective manner, and as the hill portions ascend, they pick up and drop the pulp so as to break up and render the latter more susceptible to quicker filtration.

It will now be clear that the widely divergent hills not only afford a greater spread of filter cloth, but because of these widely sloping hills, the pulpy mass not only readily enters therebetween but is the more readily discharged therefrom, as said hills ascend above the pulp level. It will also be noted that these bars present relatively broad flat faces to the pulp, which, in addition to the divergent feature, adds to the agitating efficiency of the structure.

This form of filter bar makes it possible to provide relatively small egressing chambers B, in view of the fact that the increased side area of the crown structure affords stock for a greater number of egressing openings.

It will be clear that irrespective of the cross section of the filter bars 8, apart from that shown, that it is within the province of the invention to make them with an increased thickness portion of such pronounced form as to present well defined side or lateral portions on each bar. By means of this construction, prominent hills and vales are formed.

It is believed that the invention will be fully understood from the foregoing description and while one specific form of the invention has been shown, it is not desired to be limited thereto except for such limitations as the claims may import.

We claim:—

1. In a metallurgical filter mechanism, a rotatable filter cylinder, a filter structure therefor including a series of filter bars adapted to be disposed against the interior of said cylinder and having filtering faces, a yielding sealing strip between each pair of adjacent bars, a filtering cloth extending over a plurality of the filtering faces of said series of bars, and forming with each bar a filter unit, and rod-like members holding said filter cloth against said strips to longitudinally seal each filter unit from all other filter units, and means for anchoring said members to said cylinder.

2. In a metallurgical filter mechanism, a filter cylinder having a filter structure composed of a series of bars and a filter cloth covering said bars and forming with each thereof a filter unit, and devices extending longitudinally and circumferentially of said cylinder for sealing said units from each other.

3. As a new and useful article of manufacture for metallurgical filters, a filter bar of substantially triangular cross section having one plain side, the remaining sides each having a series of filter channels extending longitudinally thereof, a portion of the linear vertex of the channelled sides being cut away in intersecting relation to said channels for egress therefrom of the solution into said cut away portion, and said bar having a bore leading from said cut away portion to said plain side for discharge of the solution.

4. As a new and useful article of manufacture for metallurgical filters, a filter bar of substantially triangular cross section having one plain side, the remaining sides each having a series of filter channels extending longitudinally thereof, a portion of the linear vertex of the channelled sides being cut away in intersecting relation to said channels for egress therefrom of the solution into said cut away portion, a substantially V-shaped perforated crown plate bridging said cut away portion to form a chamber and maintain the cross sectional continuity of said bar, and a nipple pipe leading from said chamber through the plain side of said bar for conveying off the solution.

5. In a metallurgical filter, a filter cylinder having sets of filter bars in spaced end to end relation, a filter cloth covering the exposed faces of both sets of filter bars and forming with each thereof a filter unit, and devices sealing each unit at its sides and ends from adjacent units.

6. In a metallurgical filter mechanism, a filter cylinder having a filter structure therein comprising a series of filter bars of triangular cross section and one side of each next to said cylinder being plain and the remaining sides each having a series of channels extending longitudinally thereof, a filter cloth held abreast of the channelled sides of said bars, each bar having its linear vertex recessed at one portion thereof in intersecting relation to said channels for egress of the solution from said channels into said recess, and a perforated crown structure closing said recess to form an egress chamber and maintain the cross sectional continuity of said bar, and a nipple pipe leading from said chamber through said bar and projecting through said cylinder for discharge of the filtered solution.

In witness whereof, we have hereunto affixed our hands.

ERNEST R. CRUTCHER.
EMMETT WALTMAN.
WALLACE G. WOOLF.